United States Patent [19]

Hogenson

[11] 4,253,412

[45] Mar. 3, 1981

[54] SEED CONFINING ATTACHMENT FOR A WHEAT DRILL

[76] Inventor: LaVernon S. Hogenson, Box 66, Hingham, Mont. 59528

[21] Appl. No.: 51,875

[22] Filed: Jun. 25, 1979

[51] Int. Cl.³ .............................................. A01C 5/00
[52] U.S. Cl. .................................................. 111/86
[58] Field of Search .................. 111/73, 77, 81, 85, 111/86, 87

[56] References Cited

U.S. PATENT DOCUMENTS

| | | | |
|---|---|---|---|
| 61,903 | 2/1867 | Wheeler | 111/85 |
| 141,730 | 8/1873 | Shreiner | 111/86 |
| 221,004 | 10/1879 | Strayer | 111/85 |
| 230,733 | 8/1880 | Boynton | 111/86 |
| 611,980 | 10/1898 | Smith | 111/86 |
| 1,921,886 | 8/1933 | Kriegbaum et al. | 111/73 |
| 2,096,230 | 10/1937 | Elliott | 111/86 |
| 2,885,978 | 5/1959 | Miller | 111/86 |
| 3,083,542 | 4/1963 | Summers et al. | 111/73 X |
| 3,308,775 | 3/1967 | Klene | 111/86 |
| 3,664,279 | 5/1972 | Belden | 111/85 X |

FOREIGN PATENT DOCUMENTS 129412  4/1960  U.S.S.R. ..................................... 111/85

Primary Examiner—Edgar S. Burr
Assistant Examiner—James R. Feyrer
Attorney, Agent, or Firm—James D. Givnan, Jr.

[57] ABSTRACT

An attachment is disclosed for securement to the boot of an agricultural shovel drill machine. Support structure of the attachment is affixed to the back side of the boot and serves to position a seed deflecting body proximate the discharge end of the boot which body serves to deflect the gravitating seeds forwardly. Plates also carried by the support structure act on the gravitating seed to expedite deposit of the seed in the lowermost portion of the furrow to enchance seed germination. The plates are loosely joined so as to automatically compensate for wear of the boot carried shovel and also to prevent clogging by soil. A handle is associated with the deflector body to permit positioning of same relative to the upright boot axis to enable desired seed deflection.

5 Claims, 3 Drawing Figures

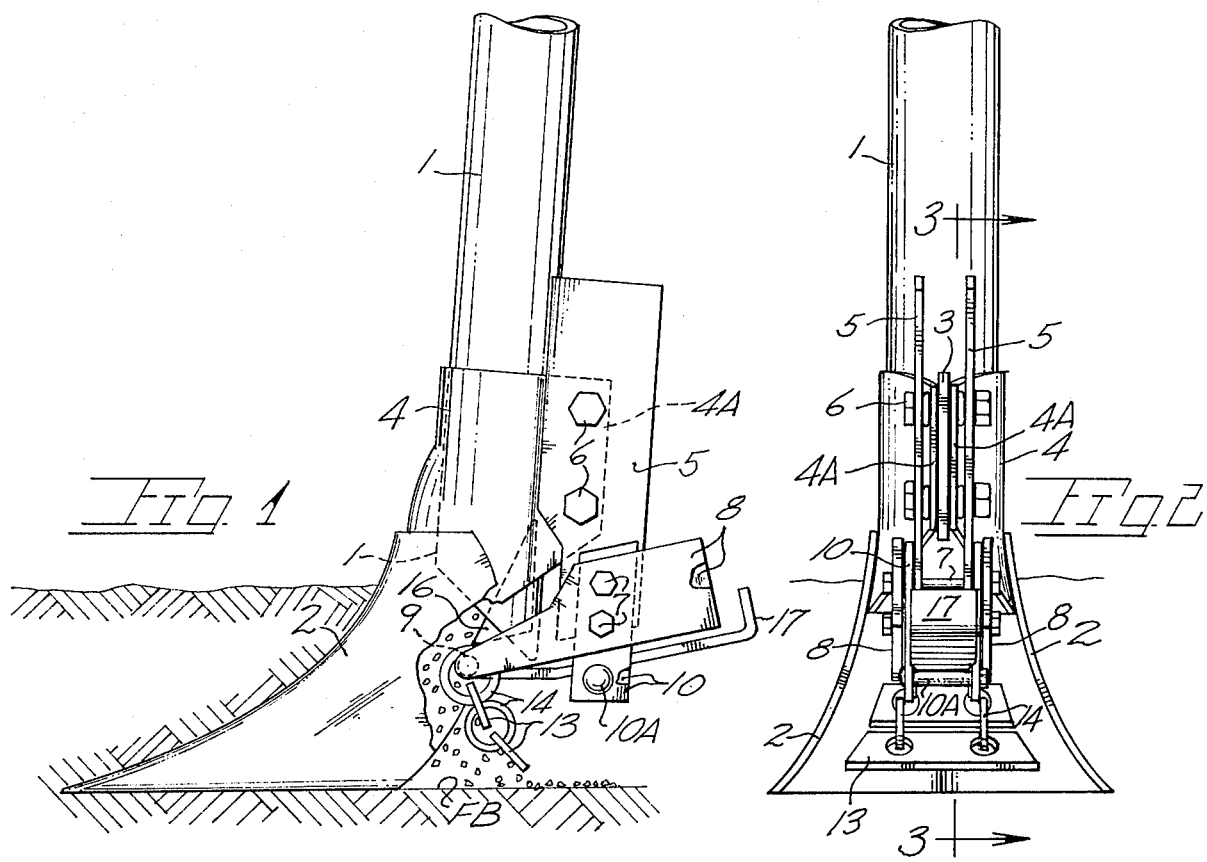
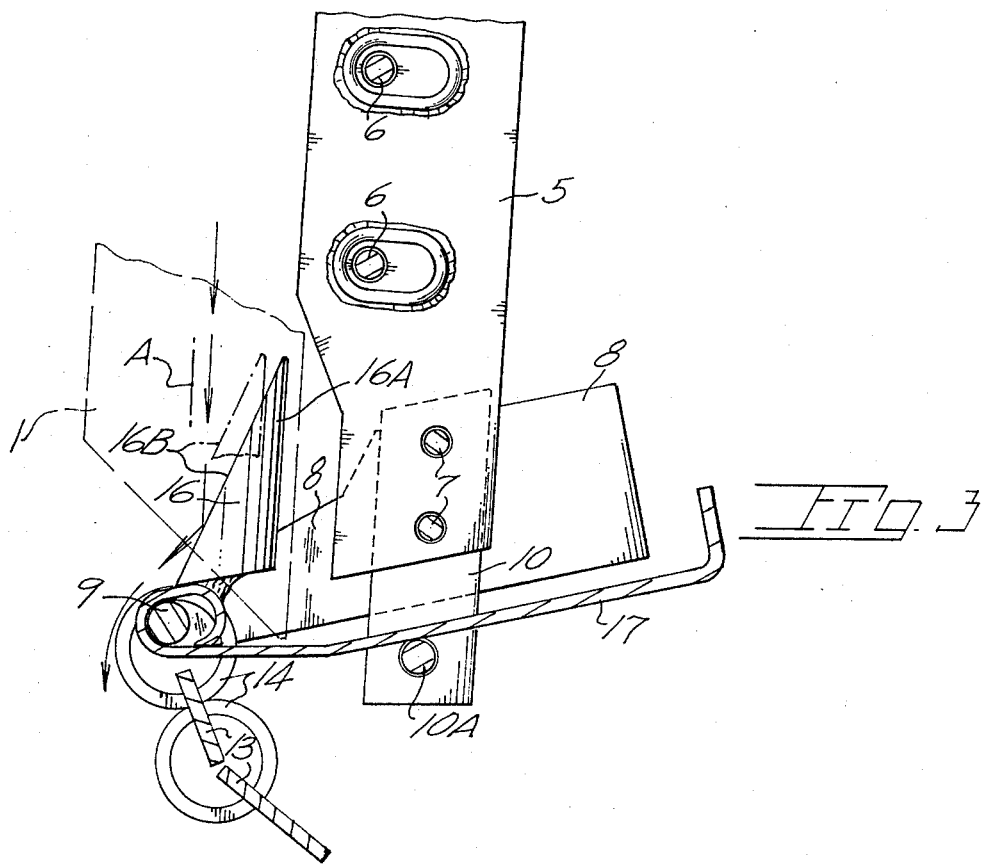

SEED CONFINING ATTACHMENT FOR A WHEAT DRILL

BACKGROUND OF THE INVENTION

The present invention pertains generally to drills used for planting of wheat or other grain crops and more particularly to an attachment for the boot or opener thereof which confines discharged seed to the furrow bottom.

In the sowing of wheat and other grain crops it is highly desirable to deposit the seeds at a depth providing suitable moisture for germination. A percentage of the seed sown with conventional drills in dry ground fails to germinate oftimes because of inadequate moisture. As the ground moisture content is usually in direct relationship to depth, it is desirable to deposit the seeds in the lowermost portion of the ground opening or furrow. Conventionally, such furrows are formed by boot attached shovels drawn through the ground in ganged fashion. Not uncommonly, seed discharged from the tubular seed delivering boot fails to alight on the furrow bottom but rather comes to rest on the elevated furrow side or in soil returning to the furrow after shovel passage with such seed having a reduced chance of germinating by reason of reduced ground moisture.

SUMMARY OF THE PRESENT INVENTION

The present invention is embodied within a boot or opener attachment having means for depositing the seed at or near the furrow bottom.

Movable members rearward of the drill boot are interconnected in a yieldable manner to avoid clogging by earthen matter. Said members act on the seed to expedite deposit of same at or near the furrow bottom. The present attachment also includes a seed deflector against which gravitating seed initially impacts. Such impingement results in the seed being deflected forwardly toward the shovel forward apex and forwardly of the seed impinging movable members. The present attachment is compatible with various boot and shovel configurations with but minor modifications.

Important objectives of the present invention include the provision of an attachment for a drill machine which acts on gravitating seed discharged to confine same against undesired lateral displacement to assure deposit of same in or near the furrow bottom; the provision of such an attachment which automatically compensates for shovel wear; the provision of such an attachment having an adjustable seed deflector contributing to proper seed placement in the furrow.

These and other objects will become subsequently apparent upon an understanding of the following description of the attachment.

BRIEF DESCRIPTION OF THE DRAWING

In the accompanying drawing:

FIG. 1 is a side elevational view of the lower end segment of a drill boot or opener with the present invention attached in place;

FIG. 2 is an elevational view thereof taken from the right hand side of FIG. 1; and FIG. 3 is an enlarged vertical sectional view taken approximately along line 3—3 of FIG. 2.

DETAILED DESCRIPTION OF THE PREFERRED EMBODIMENT

With continuing attention to the drawing wherein applied reference numerals indicate parts similarly identified herebelow, the reference numeral 1 indicates a tubular segment or boot of a conventional agricultural drill machine. The segment functions as a delivery tube for seed. Carried in the conventional manner at the lower end of tubular segment 1 is a shovel 2 of a triangular configuration which, during passage, serves to open the ground for seed reception. A series of boots or openers are normally carried in gang fashion by a wheat drill machine for the planting of several rows during one pass of the machine. The boots are adjustable for desired depth of ground penetration. Each boot normally includes a bracket 3. A boot extension at 4 is provided with flanges 4A.

As above mentioned, where the moisture content of the ground is somewhat critical, it is highly advantageous to confine the gravitating seed for deposit into the lowest portion of the ground opening or furrow bottom at FB.

With attention now to the present attachment, the same includes a support structure 5 for bolted securement to boot bracket 3. Fasteners at 6 extend through a pair of upright plates 5 of the support structure and through boot bracket or extention 3. The plates 5, adjacent their lower ends, are apertured to receive fastener assemblies 7 which serve to attach side plates 8 joined at their forward extremities by a cross pin 9. Additionally coupled by fasteners 7 is a pair of depending hangers 10. The support structure thus described serves to attach the following described structure to the boot and may be varied within the scope of the invention to best suit specific makes and models of wheat drill machines.

Depending from the support structure are seed biasing means including a series of plates 13 yieldably joined by pairs of links 14. Openings in plates 13 are elongate to facilitate relative movement between the plates to prevent the caking of soil therebetween. An uppermost pair of links is carried by cross pin 9 of the support structure. A wear compensating feature is realized by reason of the fact that as the shovel 2 wears away along its bottom edge 2A, the plates 13, being yieldable, will simply trail at a shallower rearward angle. If desired, the lowermost plate may be removed to restore the original angular relationship.

Said deflector means are indicated at 16 in the form of a body disposed proximate the lower end of delivery boot or opener 1. Said deflector means has a rounded rearward wall 16A corresponding generally to the radius of the delivery tube inner wall while a seed impinged surface is indicated at 16B, and is inclined to a boot axis A. Said impinged surface is inclined downwardly and forwardly in the direction of travel of the boot with an apparent course of seed travel being indicated by applied arrows in FIG. 3. A handle 17 is provided for insertion and locking of the deflector into position against the boot inner wall. Upon desired positioning of deflector means 16, a fastener assembly 10A, extending through hangers 10, is tightened to cause hangers 10 to laterally grip and lock handle 17 against movement. Deflector 16 may be moved forwardly to ease installation in the boot.

Operation of the attachment is believed self-explanatory upon an understanding of the foregoing description. Seeds discharged from boot or opener 1 are confined by the seed biasing plates at 13 to assure seed deposit at or near the furrow bottom intermediate the shovel sides as opposed to shallower deposit within soil gravitating back into the furrow after passage.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. An attachment for a tubular seed delivery boot of the type having a shovel with sides and a forward apex and a rearwardly directed bracket at the boot lower end and carried by a shovel drill machine for the continuous planting of seeds, said attachment comprising, a support structure for attachment to the boot bracket, side plates carried by the support structure and extending forwardly therefrom and interconnected at their forward ends by a cross pin located below the open end of the seed delivery boot, a deflector supported by said cross pin and disposed within the lower end of the boot, said deflector having a forwardly facing inclined surface so as to deflect seeds forwardly in the direction of travel of said boot, and multiple plates and interconnecting links carried by said cross pin so as to dispose an uppermost plate below the deflector so as to act on gravitating seed to cause same to be forwardly deflected toward the lowermost surface of the furrough bottom substantially intermediate the shovel sides with seed deposit prior to return of displaced soil to the furrough.

2. The attachment claimed in claim 1 additionally including a handle loosely coupled at its forward end to said cross pin and thereat serving to receive said deflector to enable fore-and-aft deflector adjustment relative the cross pin and the tubular seed delivery boot.

3. The attachment claimed in claim 2 wherein said support structure includes a pair of hangers and a fastener assembly extending jointly therethrough, said hangers oppositely disposed at the sides of the handle whereby tightening of the fastener assembly will cause the hangers to grip and secure the handle against movement.

4. The attachment claimed in claim 1 wherein said deflector has a rounded rearward wall enabling rearward nesting of same within the tubular seed delivery boot to compel forward deflection of all seeds.

5. The attachment claimed in claim 1 wherein said interconnecting links are of circular shape, said plates defining link receiving openings of a size to receive at least two links in loosely coupled fashion for maximum movement between plates to inhibit soil clogging.

* * * * *